United States Patent
Ucar et al.

(10) Patent No.: US 12,358,536 B2
(45) Date of Patent: Jul. 15, 2025

(54) SYSTEMS AND METHODS FOR ESTIMATING THE ORIGINS OF ABNORMAL DRIVING

(71) Applicant: Toyota Motor Engineering & Manufacturing North America, Inc., Plano, TX (US)

(72) Inventors: Seyhan Ucar, Mountain View, CA (US); Haritha Muralidharan, Santa Clara, CA (US); Emrah Akin Sisbot, Menlo Park, CA (US); Kentaro Oguchi, Mountain View, CA (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 331 days.

(21) Appl. No.: 17/992,160

(22) Filed: Nov. 22, 2022

(65) Prior Publication Data
US 2024/0166244 A1    May 23, 2024

(51) Int. Cl.
*B60W 60/00* (2020.01)
*G06V 10/764* (2022.01)
*G06V 20/58* (2022.01)

(52) U.S. Cl.
CPC ....... *B60W 60/0027* (2020.02); *G06V 10/764* (2022.01); *G06V 20/58* (2022.01); *B60W 2554/4046* (2020.02); *B60W 2554/80* (2020.02)

(58) Field of Classification Search
CPC ..... B60W 60/0027; B60W 2554/4046; B60W 2554/80; B60W 30/09; G06V 10/764;
(Continued)

(56) References Cited

U.S. PATENT DOCUMENTS 8,467,956 B2    6/2013    Lee et al.
10,077,050 B2   10/2018   Rajvanshi et al.
(Continued)

FOREIGN PATENT DOCUMENTS

WO    2021145367 A1    7/2022

OTHER PUBLICATIONS

Zohrevand et al. "Should I Raise the Red Flag? An analytic review of anomaly scoring methods toward mitigating false alarms", Aug. 30, 2020, 11 pages.
(Continued)

*Primary Examiner* — Daniel M. Robert
(74) *Attorney, Agent, or Firm* — Christopher G. Darrow; DARROW MUSTAFA PC

(57) ABSTRACT

Systems, methods, and other embodiments described herein relate to estimating the origins of abnormal driving through observed driving patterns. In one embodiment, a method includes detecting, using parallel computations, abnormal classifications associated with a subject vehicle and nearby vehicles according to driving patterns derived from observation data, the abnormal classifications being associated with exceeding a position range in the observation data. The method also includes estimating an origin of abnormal driving with happens-before analysis according to the abnormal classifications, and the abnormal driving is associated with deviations in a traffic flow associated with the subject vehicle and the nearby vehicles. The method also includes controlling the subject vehicle using a driving command according to the origin.

20 Claims, 6 Drawing Sheets

(58) Field of Classification Search
CPC ........ G06V 20/58; G06V 10/30; G06V 10/80; G06Q 40/08
See application file for complete search history.

(56) References Cited

U.S. PATENT DOCUMENTS

| | | | |
|---|---|---|---|
| 10,762,786 | B1 | 9/2020 | Dewey et al. |
| 11,380,198 | B2 | 7/2022 | Ucar et al. |
| 2017/0291602 | A1* | 10/2017 | Newman ............... B60W 10/04 |
| 2018/0050673 | A1* | 2/2018 | D'sa ......................... B60T 8/58 |
| 2019/0031189 | A1* | 1/2019 | Patana ................. B60W 10/20 |
| 2019/0213429 | A1* | 7/2019 | Sicconi .................. G06F 3/012 |
| 2020/0008028 | A1 | 1/2020 | Yang |
| 2021/0061272 | A1* | 3/2021 | Kawanai ............... B60W 30/09 |
| 2021/0110484 | A1* | 4/2021 | Shalev-Shwartz ... G05D 1/0088 |
| 2021/0221382 | A1 | 7/2021 | Ucar et al. |
| 2022/0270180 | A1* | 8/2022 | Leise ..................... G06N 20/00 |
| 2022/0292614 | A1* | 9/2022 | Georges ................ G06Q 50/26 |
| 2022/0299324 | A1* | 9/2022 | Carbery ................. H04W 4/46 |
| 2022/0332324 | A1* | 10/2022 | Ucar ..................... B60W 40/09 |
| 2024/0067164 | A1* | 2/2024 | Gierzynski ........... B60W 30/09 |
| 2024/0166244 | A1* | 5/2024 | Ucar ..................... G06V 10/80 |

OTHER PUBLICATIONS

Unknown "Critical Reasons for Crashes Investigated in the National Motor Vehicle Crash Causation Survey," NHTSA's National Center for Statistics and Analysis, Mar. 2018, pp. 1-3, found at https://crashstats.nhtsa.dot.gov/Api/Public/Publication/812506.

Unknown "Eyes on the road. Let's end distracted driving," last accessed on Oct. 4, 2022, 3 pages, found at https://www.selective.com/about-selective/unique-perspectives/distracted-driving.

Unknown "Global status report on road safety 2018," World Health Organization, 2018, 403 pages, found at https://www.who.int/publications/i/item/9789241565684.

Zohrevand et al., "Should I Raise the Red Flag? A comprehensive survey of anomaly scoring methods toward mitigating false alarms," Aug. 30, 2020, pp. 1-11.

* cited by examiner

SYSTEMS AND METHODS FOR ESTIMATING THE ORIGINS OF ABNORMAL DRIVING

TECHNICAL FIELD

The subject matter described herein relates, in general, to observing driving environments for abnormal driving, and, more particularly, to estimating the origins of abnormal driving using driving patterns.

BACKGROUND

Driving behavior involving vehicle maneuvers, such as moving abruptly, on the road effect safety. For example, fatal crashes frequently involve aggressive driving and atypical trajectories by a vehicle. Rear-end collisions frequently involve a distracted operator of a follower vehicle. Driver monitoring systems (DMS) in a vehicle increase safety by observing and notifying the operator of inattentive driving behavior. However, a DMS does not notify the operator of aggressive, distracted, and other behaviors by nearby vehicles.

In various implementations, systems process data from sensors on a vehicle to observe driving environments. For example, these systems detect when a follower vehicle is behaving abnormally and suggest actions for reducing collision risk. In one approach, the follower vehicle exhibits fluctuating distances during distracted driving. As such, a subject vehicle can maneuver to prevent a rear-end collision. However, systems detecting abnormal behavior generate false positives from relationships between observation data of the subject and follower vehicles. For instance, the subject vehicle driving aggressively generates data showing fluctuations in separation distance with the follower vehicle. In response, the system can erroneously mislabel the follower vehicle as distracted instead of the subject vehicle.

SUMMARY

In one embodiment, example systems and methods relate to estimating the origins of abnormal driving through observed driving patterns. In various implementations, systems identifying the source of abnormal driving within traffic encounter certain errors (e.g., false positives). For example, a system observing fluctuations in the distance between subject and follower vehicles erroneously detects the origin as the follower vehicle when relying on rear-sensor (e.g., rear-camera) data. Instead, the origin of the fluctuation is the subject or other nearby vehicles that cause the erratic motion perceived as the follower vehicle. Therefore, in one embodiment, a detection system reliably detects the origin of abnormal driving through parallel computations for abnormal classification and happens-before analysis. Here, the parallel computations may capture additional modalities through a time-series using observation data about vehicle trajectories. In one approach, the detection system estimates abnormal classifications for subject and nearby vehicle trajectories using the parallel computations and driving patterns before further processing. The detection system computes estimations to detect an origin of abnormal driving using happens-before analysis that accurately synchronizes and orders the abnormal classifications. In this way, the detection system reduces erroneous detection of the origin and increases reliability for systems depending on the origin.

Moreover, in one embodiment, the happens-before analysis reliably outputs states of subject and nearby vehicles using logical and temporal associations of the abnormal classifications. For example, the happens-before analysis determines that distracted driving by the subject vehicle preceded aggressive driving or swerving detected for a follower vehicle. As such, the happens-before analysis estimates and outputs that the subject vehicle is driving abnormally instead of erroneously labeling the follower vehicle as the origin. Accordingly, the detection system improves vehicle safety by reliably identifying the origin of abnormal driving for vehicle systems (e.g., alarm systems, automated driving, and so on).

In one embodiment, a detection system for estimating the origins of abnormal driving through observed driving patterns is disclosed. The detection system includes memory storing instructions that, when executed by a processor, cause the processor to detect, using parallel computations, abnormal classifications associated with a subject vehicle and nearby vehicles according to driving patterns derived from observation data, the abnormal classifications being associated with exceeding a position range in the observation data. The instructions also include instructions to estimate an origin of abnormal driving with happens-before analysis according to the abnormal classifications, and the abnormal driving is associated with deviations in a traffic flow associated with the subject vehicle and the nearby vehicles. The instructions also include instructions to control the subject vehicle using a driving command according to the origin.

In one embodiment, a non-transitory computer-readable medium for estimating the origins of abnormal driving through observed driving patterns and including instructions that when executed by a processor cause the processor to perform one or more functions is disclosed. The instructions include instructions to detect, using parallel computations, abnormal classifications associated with a subject vehicle and nearby vehicles according to driving patterns derived from observation data, the abnormal classifications being associated with exceeding a position range in the observation data. The instructions also include instructions to estimate an origin of abnormal driving with happens-before analysis according to the abnormal classifications, and the abnormal driving is associated with deviations in a traffic flow associated with the subject vehicle and the nearby vehicles. The instructions also include instructions to control the subject vehicle using a driving command according to the origin.

In one embodiment, a method for estimating the origins of abnormal driving through observed driving patterns is disclosed. In one embodiment, the method includes detecting, using parallel computations, abnormal classifications associated with a subject vehicle and nearby vehicles according to driving patterns derived from observation data, the abnormal classifications being associated with exceeding a position range in the observation data. The method also includes estimating an origin of abnormal driving with happens-before analysis according to the abnormal classifications, and the abnormal driving is associated with deviations in a traffic flow associated with the subject vehicle and the nearby vehicles. The method also includes controlling the subject vehicle using a driving command according to the origin.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with estimating the origins of abnormal driving through observed driving patterns are disclosed herein. In various implementations, systems (e.g., driver monitoring systems (DMS)) generate false positives when identifying the source of abnormal driving within a traffic flow. For example, a DMS processes image data from a cabin camera and erratic values by speed sensors to infer that the operator is distracted or swerving while driving. However, the actual cause of the speed changing abruptly and the operator reacting can be a preceding vehicle driving aggressively. In another example, a system erroneously detects distracted driving of a follower vehicle through a perception system when the source is the subject vehicle moving aggressively. Therefore, in one embodiment, a detection system identifies the origin of abnormal driving through parallel computations of vehicle interactions and happens-before analysis. In particular, the parallel computations separately detect abnormal classifications of the subject vehicle (e.g., ego vehicle), a follower vehicle, and a preceding vehicle (e.g., ado vehicle) from different perspectives by deriving driving patterns. Here, the abnormal classifications may be derived from sudden changes in the observation data acquired by the subject vehicle over a network or locally from sensors. Also, the parallel computations can capture additional modalities through a time-series using the observation data about vehicle trajectories. In this way, the detection system reduces false positives by processing different perspectives from the subject vehicle and computation times through parallel processing.

In various implementations, the detection system computes estimates for identifying an origin of abnormal driving with happens-before analysis of the abnormal classifications, where the abnormal driving reflects deviations in a traffic flow by vehicles. The happens-before analysis outputs states and interactions between vehicles by assessing and temporally organizing the abnormal classifications. For example, the detection system reliably estimates that distracted driving by the subject vehicle preceded erratic driving (e.g., swerving) by a follower vehicle through the happens-before analysis of the abnormal classifications. Accordingly, the detection system improves the detection of the abnormal driving source through accurate classification and happens-before computations, thereby improving the performance of downstream tasks.

Figure 1:
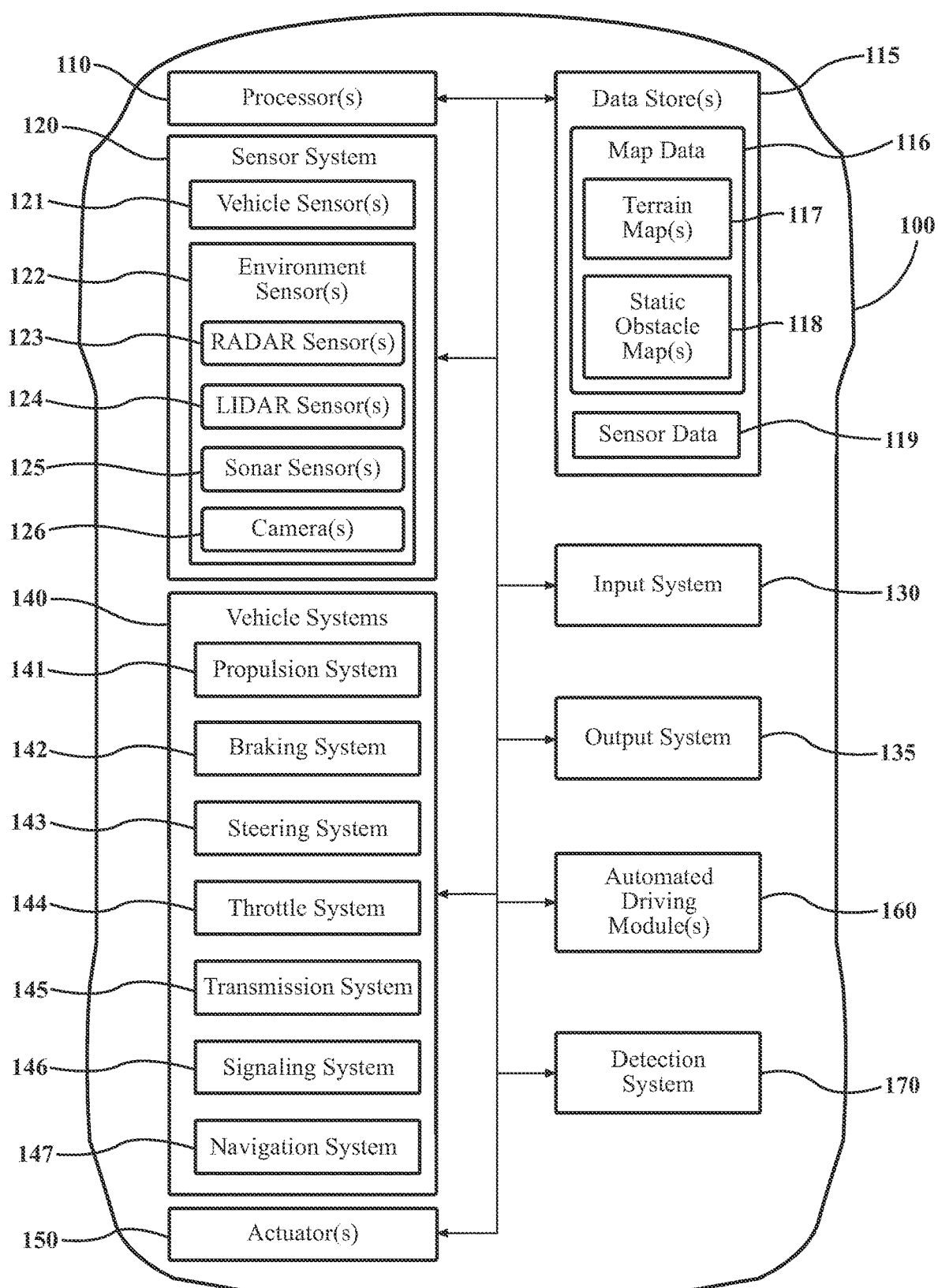
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, a detection system 170 uses road-side units (RSU), consumer electronics (CE), mobile devices, robots, drones, and so on that benefit from the functionality discussed herein associated with estimating the origins of abnormal driving through observed driving patterns.

The vehicle 100 also includes various elements. It will be understood that in various embodiments, the vehicle 100 may have less than the elements shown in FIG. 1. The vehicle 100 can have any combination of the various elements shown in FIG. 1. Furthermore, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Furthermore, the elements shown may be physically separated by large distances. For example, as discussed, one or more components of the disclosed system can be implemented within a vehicle while further components of the system are implemented within a cloud-computing environment or other system that is remote from the vehicle 100.

Some of the possible elements of the vehicle 100 are shown in FIG. 1 and will be described along with subsequent figures. However, a description of many of the elements in FIG. 1 will be provided after the discussion of FIGS. 2-6 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes the detection system 170 that is implemented to perform methods and other functions as disclosed herein relating to improving the estimation for the origins of abnormal driving through observed driving patterns. Furthermore, the detection system 170, in various embodiments, is implemented partially within the vehicle 100, and as a cloud-based service. For example, in one approach, functionality associated with at least one module of the detection system 170 is implemented within the vehicle 100 while further functionality is implemented within a cloud-based computing system.

Figure 2:
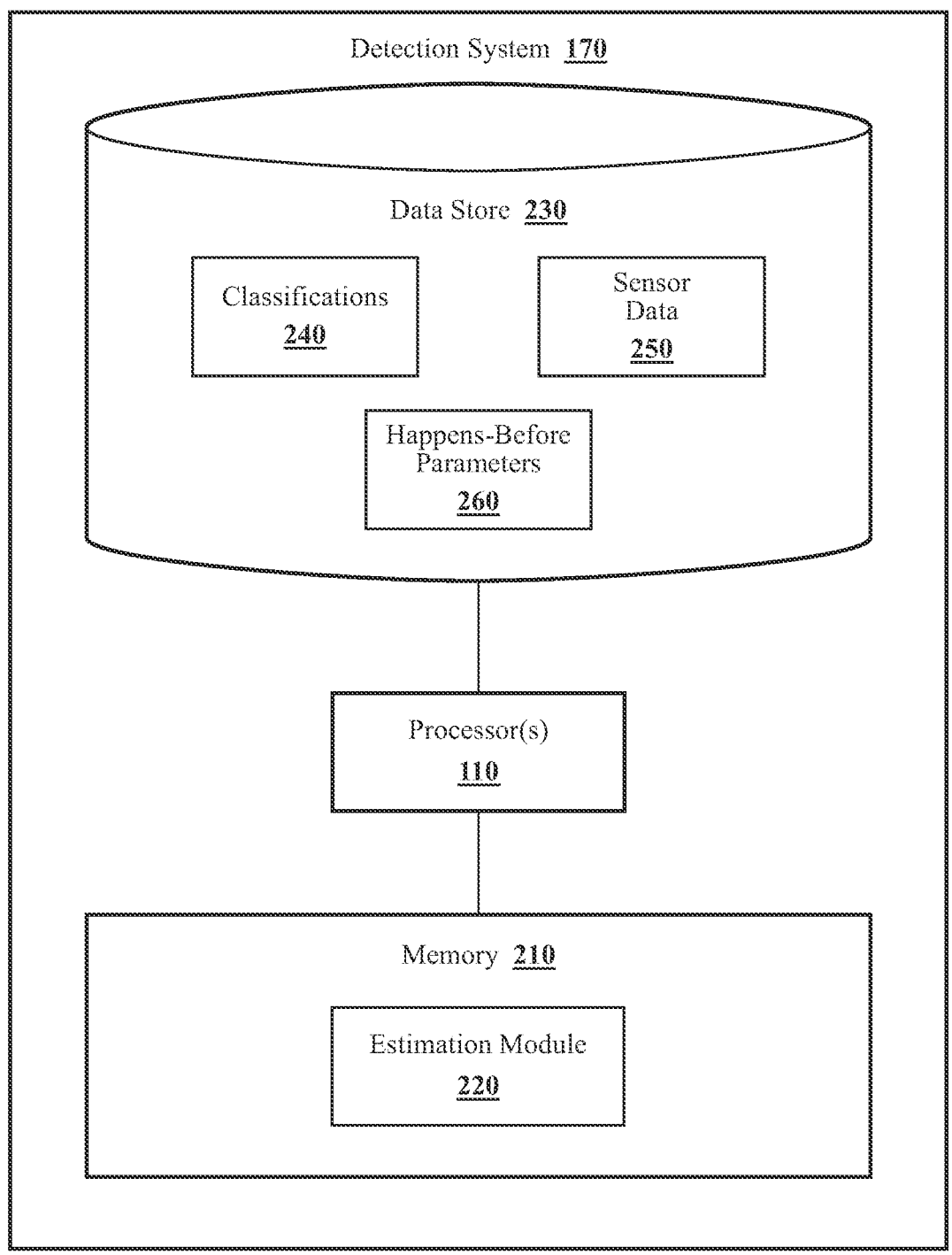
FIG. 2 illustrates one embodiment of a detection system that is associated with estimating the origins of abnormal driving through observed and identified driving patterns.

With reference to FIG. 2, one embodiment of the detection system 170 of FIG. 1 is further illustrated. The detection system 170 is shown as including a processor(s) 110 from the vehicle 100 of FIG. 1. Accordingly, the processor(s) 110 may be a part of the detection system 170, the detection system 170 may include a separate processor from the processor(s) 110 of the vehicle 100, or the detection system 170 may access the processor(s) 110 through a data bus or another communication path. In one embodiment, the detection system 170 includes a memory 210 that stores an estimation module 220. The memory 210 is a random-access memory (RAM), a read-only memory (ROM), a hard-disk drive, a flash memory, or other suitable memory for storing the estimation module 220. The estimation module 220 is, for example, computer-readable instructions that when executed by the processor(s) 110 cause the processor(s) 110 to perform the various functions disclosed herein.

The detection system 170, as illustrated in FIG. 2, is generally an abstracted form. For example, computing tasks for the detection system 170 are executed between the vehicle 100 and an edge server in a cloud-computing environment. In this way, the detection system 170 processes complex scenarios involving abnormal driving efficiently through load distribution.

Furthermore, the estimation module 220 generally includes instructions that function to control the processor(s) 110 to receive data inputs from one or more sensors of the vehicle 100 for identifying and assessing the origin of abnormal driving. The inputs are, in one embodiment, observations of one or more objects in an environment proximate to the vehicle 100 and/or other aspects about the surroundings. As provided for herein, the estimation module 220, in one embodiment, acquires the sensor data 250 that includes at least camera images. In further arrangements, the estimation module 220 acquires the sensor data 250 from further sensors such as radar sensors 123, LIDAR sensors 124, and other sensors as may be suitable for identifying vehicles and locations of the vehicles.

Accordingly, the estimation module 220, in one embodiment, controls the respective sensors to provide the data inputs in the form of the sensor data 250. Additionally, while the estimation module 220 is discussed as controlling the various sensors to provide the sensor data 250, in one or more embodiments, the estimation module 220 can employ other techniques to acquire the sensor data 250 that are either active or passive. For example, the estimation module 220 may passively sniff the sensor data 250 from a stream of electronic information provided by the various sensors to further components within the vehicle 100. Moreover, the estimation module 220 can undertake various approaches to fuse data from multiple sensors when providing the sensor data 250 and/or from sensor data acquired over a wireless communication link. Thus, the sensor data 250, in one embodiment, represents a combination of perceptions acquired from multiple sensors.

Moreover, in one embodiment, the detection system 170 includes a data store 230. In one embodiment, the data store 230 is a database. The database is, in one embodiment, an electronic data structure stored in the memory 210 or another data store and that is configured with routines that can be executed by the processor(s) 110 for analyzing stored data, providing stored data, organizing stored data, and so on. Thus, in one embodiment, the data store 230 stores data used by the estimation module 220 in executing various functions. In one embodiment, the data store 230 includes the sensor data 250 along with, for example, metadata that characterize various aspects of the sensor data 250. For example, the metadata can include location coordinates (e.g., longitude and latitude), relative map coordinates or tile identifiers, time/date stamps from when the separate sensor data 250 was generated, and so on. In one embodiment, the data store 230 further includes the classifications 240 and the happens-before parameters 260. The classifications 240 may define behaviors about driving scenarios and abnormalities from observation data acquired in the sensor data 250. For example, an abnormal classification results from a sudden change in the observation data (e.g., camera data, LIDAR data, etc.) for a separation distance, a following distance, speed, relative speed, and so on between the target or the nearby vehicles. As such, abnormal classifications can include aggressive driving, anomalous maneuvers, speeding, distracted driving (e.g., texting), erratic trajectories, reckless driving, and off-center trajectories. For example, distracted driving involves a lane offset for an extended period, swerving, delayed reactions, fluctuating separation distances, and so on, such as from texting or instrument control in the vehicle 100. Reckless driving may include unsignaled lane changes, tailgating, cutting-in lanes, sudden lane changes, and so on. Regarding the happens-before parameters 260, this data includes differences in speed, distance, paths, and so on between vehicles factored by the happens-before analysis as explained below.

Figure 3:
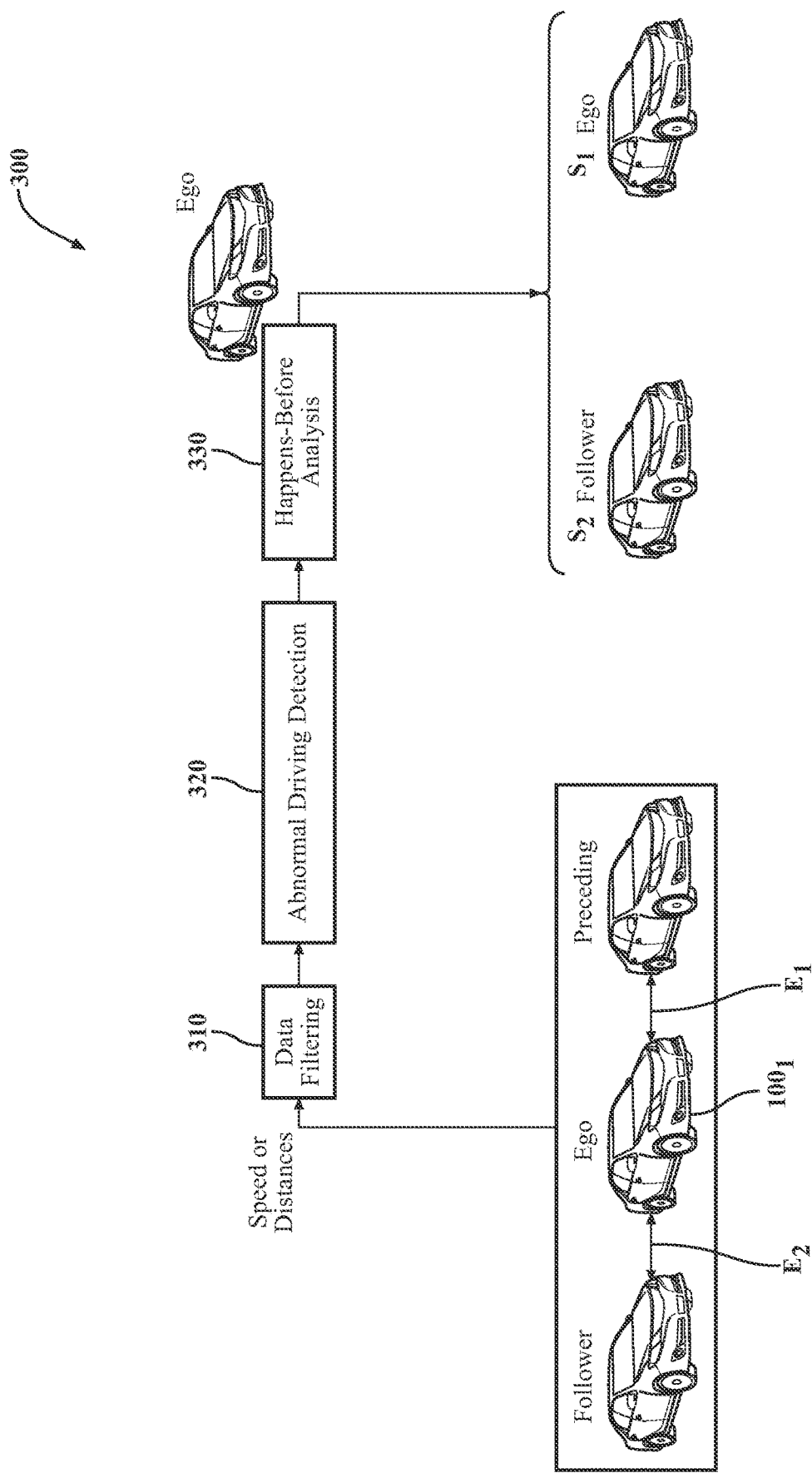
FIG. 3 illustrates one embodiment of the detection system of FIG. 2 analyzing a driving scenario involving follower and preceding vehicles.

Now turning to FIG. 3, one embodiment of the detection system of FIG. 2 analyzing a driving scenario involving follower and preceding vehicles 300 is illustrated. In various implementations, the estimation module 220 is configured to perform additional tasks beyond controlling the respective sensors to acquire and provide the sensor data 250. For example, the estimation module 220 includes instructions that cause the processor 110 to identify or detect an origin of abnormal driving through happens-before analysis with the abnormal classifications. Here, the abnormal driving is associated with deviations in a traffic flow involving the vehicle 100 as a subject vehicle (e.g., an ego vehicle) and nearby vehicles (e.g., an ado vehicle). A driving scenario for the traffic flow involves an ego vehicle $100_1$ having a preceding vehicle and conditions $E_1$. The condition $E_1$ can include the separation distances between vehicles and speeds of the subject vehicle. Correspondingly, the follower vehicle is associated with conditions $E_2$ of separation distances and speeds. In one approach, the ego vehicle $100_1$ uses image data from a backup camera (e.g., a monocular camera) and depth estimation for computing the distance to the follower vehicle. As explained below, the ego vehicle $100_1$ may also analyze bus data from a controller area network (CAN) for retrieving speed values and executing parallel computations concurrently with the data, thereby improving the identification of abnormal driving.

In FIG. 3, the data filtering 310 processes the sensor data 250 having observation data including $E_1$ and $E_2$ to reduce noise. For example, the data filtering 310 discards a distance value that is above multiple standard deviations from a mean value. The data filtering 310 can also normalize values so that values within a trend (e.g., rapid deceleration, constant acceleration, etc.) are overweighted and others against the trend are underweighted. In this way, the detection system 170 increases reliability when determining the origin of abnormal driving through improved data quality.

In various implementations, the abnormal driving detection 320 processes the filtered data and classifies driving behavior according to the classifications 240. For example, the abnormal driving detection 320 outputs normal, aggressive, distracted, intoxicated, and so on. Here, the detection system 170 runs parallel computations for analyzing traffic scenarios that prevents false positives. For example, the computations involve observing following distances between the ego vehicle $100_1$ and a follower vehicle and the ego vehicle $100_1$ and a preceding vehicle separately. As previously explained, the detection system 170 reduces false positives by processing different perspectives from the subject vehicle and diverse times through parallel processing.

Moreover, the parallel computations add modalities and dimensions to increase classification accuracy and the origin of abnormal driving. For example, the detection system 170 determines that a follower vehicle is distracted from erratic deviations (e.g., spikes, dips, etc.) in following distances (e.g., distant-to-short). In one approach, the detection system 170 classifies the follower vehicle as distracted if the follower vehicle has a driving pattern that deviates above a threshold within a time frame. This analysis may involve forming a time-series with observation data for determining a pattern in the following distance. A time-series has data points indexed, graphed, and so on in time order. This may include equally spaced points of discrete data (e.g., speed of the subject vehicle). The detection system 170 implements a time-series analysis that processes time-series data to extract significant statistics and predictions associated with the observation data.

As further explained below, the detection system 170 classifies sudden speed changes of the ego vehicle $100_1$ in parallel for reducing false positives associated with abnormal driving. For instance, an indicator of aggressive driving is unnecessary acceleration, deceleration, and so on by the ego vehicle $100_1$. In one approach, the detection system 170 identifies the ego vehicle $100_1$ as aggressive if vehicle speeds for a driving pattern deviate above a threshold within a time frame. In this way, the detection system 170 can improve the reliability of classification through time-series analysis by reducing the influence of noise amongst data samples.

The detection system 170 can also train a machine learning (ML) model with the time-series having the distance or speed data to predict classifications. For example, the detection system 170 implements a deep convolutional encoder-decoder (e.g., a convolutional neural network (CNN)) to extract features of a driving scenario from the sensor data 250 and output one of the classifications 240. In one approach, the output is a probability of accuracy for the abnormal classification (e.g., aggressive, distracted, etc.). In this way, the detection system 170 improves the reliability of downstream tasks (e.g., notification systems) according to the probability.

Moreover, the detection system 170 executes the happens-before analysis 330 and outputs states $S_1$ and $S_2$. Here, the happens-before analysis 330 extrapolates a stable model of abnormal events and behaviors by synchronizing, sorting, and ordering results using the abnormal classifications computed in parallel. In one approach, the detection system 170 processes an abnormal event one-by-one to reach a general consensus about causality between discrete points in the time-series data. As such, the happens-before analysis 330 reduces false positives and improves accuracy about the origins of abnormal driving. For example, unnecessary deceleration within a time frame by the ego vehicle $100_1$ erroneously makes the follower vehicle look erratic when analyzing following distances. In another example, the follower vehicle imitates the driving of the ego vehicle $100_1$ by accelerating and decelerating erratically. This observation may cause the ego vehicle $100_1$ to erroneously label the follower as an aggressive driver. In another example, the follower vehicle drives conservatively by increasing separation distance when the ego vehicle $100_1$ is driving aggressively. For these driving patterns, the happens-before analysis 330 reliably identifies that the origin of abnormal driving is the ego vehicle $100_1$ rather than the follower vehicle.

In FIG. 3, the happens-before analysis 330 also computes causality by ordering certain driving patterns classified from the abnormal driving detection 320. For example, the ego vehicle $100_1$ perceives a follower vehicle as an aggressive driver from detecting an escape maneuver. However, the detection system 170 uses the happens-before analysis 330 and determines that the escape maneuver was actually caused by inattentive driving of the ego vehicle $100_1$. Here, the follower vehicle has varying separation distances and aggressively changes lanes because the ego vehicle $100_1$ was swerving inside a lane due to texting, instrument control, and so on.

The happens-before analysis 330 can also output a state sequence or timeline instead of estimating the origin of abnormal driving. Here, the detection system 170 estimates the origin of abnormal driving by state timing in the time domain until reaching statistical significance. For example, the detection system 170 filters acquired driving data and initially identifies the follower vehicle as abnormal due to irregular driving patterns using states $S_1$ and $S_2$. In this driving scenario, the detection system 170 estimates after further processing that $S_1$ is aggressive driving (e.g., erratic acceleration) by the ego vehicle $100_1$ that happened-before $S_2$ representing distracted driving (e.g., erratic separation distances) from the follower vehicle. For example, the detection system 170 reliably makes this estimate because $S_1 \rightarrow S_2$ satisfied a threshold set (distance X, relative velocity V), where X varied over 5 meters (m) and relative velocity exceeded 20 kilometers (km)/hour (h) within a 10 second (s) time window. Although this example includes exceeding a position range and velocity, other scenarios include parameter fluctuations in the sensor data 250 for one of speed, lane offset, and so on such that each parameter is associated with different threshold levels.

In another embodiment, the detection system 170 generates control suggestions to mitigate collisions after reliably identifying the origin. For instance, the detection system 170 coaches an operator by generating control suggestions (e.g., lane change, speed advisory, etc.) to reduce collision risk caused by abnormal driving. In one approach, the detection system 170 communicates the origin to a remote server, such as for intelligent traffic management. In one approach, the remote server can form a mitigation plan having trajectories for execution by automated vehicles near the ego vehicle $100_1$. In this way, the remote server can notify other connected vehicles near the subject, follower, or preceding vehicle about abnormal behaviors to take evasive measures that improve safety.

Figure 4A:
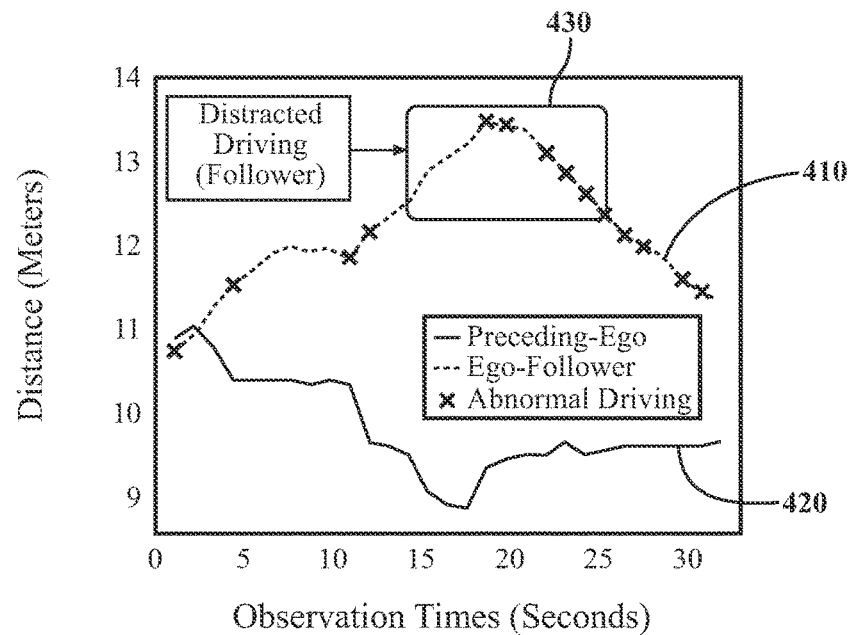
FIGS. 4A and 4B illustrate examples of observing abrupt deviations by vehicles and detecting abnormal driving.
Figure 4B:
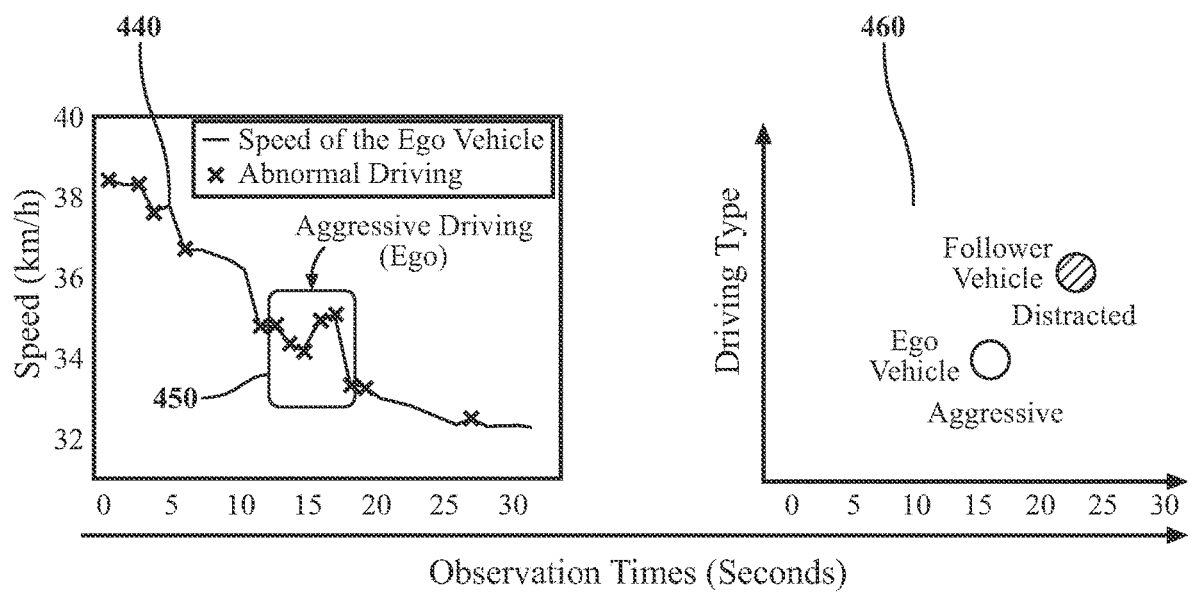

FIGS. 4A and 4B illustrate examples of observing abrupt deviations by vehicles and detecting abnormal driving. In FIG. 4A, the detection system 170 acquires distance measurements between the ego vehicle $100_1$ and the follower vehicle 410 and the preceding vehicle 420 over discrete observation times (e.g., per second). In one approach, the detection system 170 compares the distance measurements in a time-series using locations and predicts or detects abnormal events from abrupt deviations by deriving driving patterns. In certain driving scenarios, the abnormal driving detection 320 identifies observations of abnormal driving and initially classifies the observations as distracted driving 430 by the follower vehicle. Here, the separation distance between observation times 15 s-25 s is above 12 m between follower and ego vehicles for the distracted driving 430. However, the origin and cause of the distracted driving 430 may actually be the ego vehicle moving erratically. As such, the detection system 170 performs the happens-before analysis 330 in driving scenarios to prevent false positives about the origin of abnormal driving.

In FIG. 4B, the detection system 170 observes the speed values (e.g., km/h) of the ego vehicle $100_1$ over discrete speed values 440 for abnormalities. Here, the ego vehicle $100_1$ unnecessarily accelerates/decelerates over a few observation times. The abnormal driving detection 320 classifies the behavior during the period 450 as aggressive driving by the ego vehicle $100_1$ because of an unusual speed spike above a threshold of 2 km/h during deceleration. In addition, the graph 460 demonstrates results from the happens-before analysis 330 over time. This analysis involves sorting data of abnormal driving and classified behavior by the detection system 170. In this example, the ego vehicle $100_1$ moves in an aggressive driving pattern before the follower vehicle appears as a distracted driver. As such, the detection system 170 outputs that the origin of abnormal driving is the ego vehicle $100_1$ with improved accuracy and reliability.

Figure 5A:
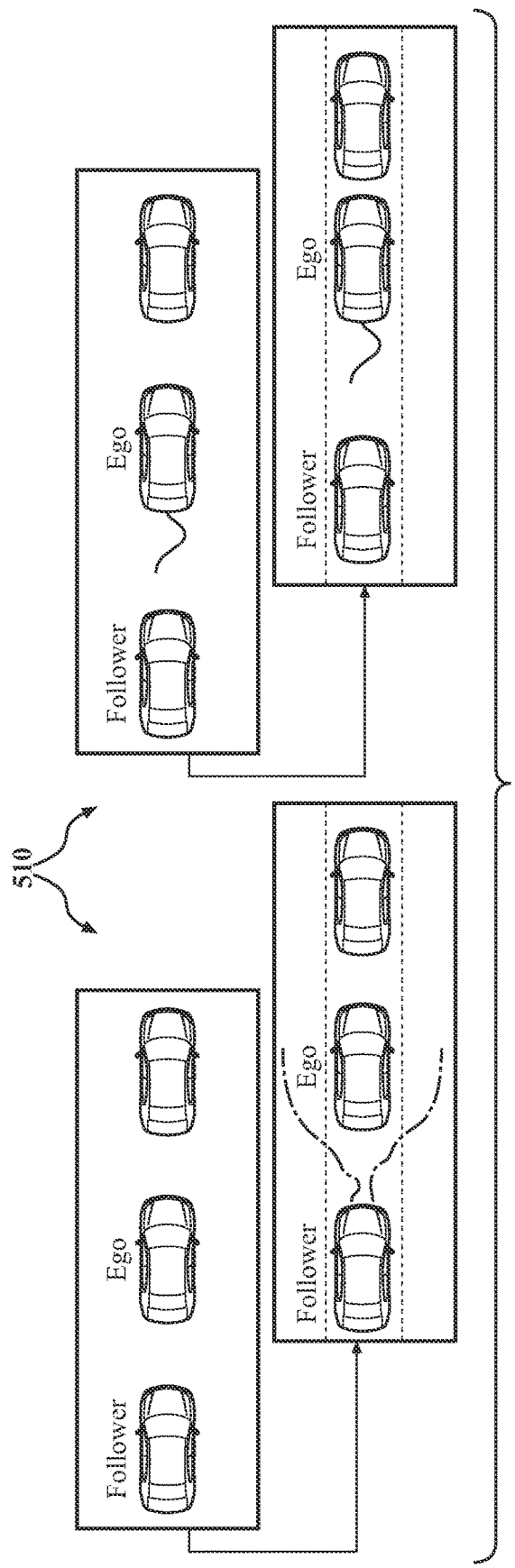
FIGS. 5A and 5B illustrate examples of the detection system estimating an origin of abnormal driving through happens-before analysis.
Figure 5B:
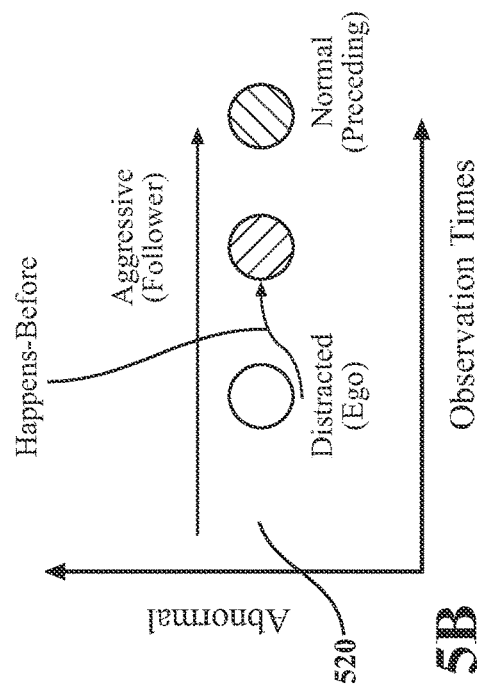

Turning now to FIGS. 5A and 5B, examples of the detection system 170 computing estimates to identify an origin of abnormal driving through happens-before analysis are illustrated. Here, computations from the sensor data 250 for the driving scenario 510 indicate that the follower vehicle is swerving and failing to stay within a driving lane. The detection system 170 initially classifies this movement pattern as aggressive and evasive for the follower vehicle. However, the computations from the sensor data 250 for the driving scenario 510 also indicate that the ego vehicle is swerving within a lane. As such, the detection system 170 classifies the ego vehicle $100_1$ as exhibiting a movement pattern for distracted driving.

Moreover, in various implementations, the detection system 170 executes happens-before analysis 330 and estimates whether the ego vehicle $100_1$ is the origin of abnormal driving involving the driving scenario 510. After synchronization and statistical ordering, the graph 520 illustrates that the ego vehicle $100_1$ demonstrated distracted driving before aggressive driving by the follower vehicle. In addition, the driving scenario 510 includes observations of a movement pattern that is normal by the preceding vehicle precluding that vehicle as the source. In this example, the ego vehicle $100_1$ moves in a distracted driving pattern before the follower vehicle exhibits aggressive driving. Accordingly, the detection system 170 outputs that the origin of abnormal driving is the ego vehicle $100_1$ instead of the follower vehicle with improved accuracy and reliability.

Figure 6:
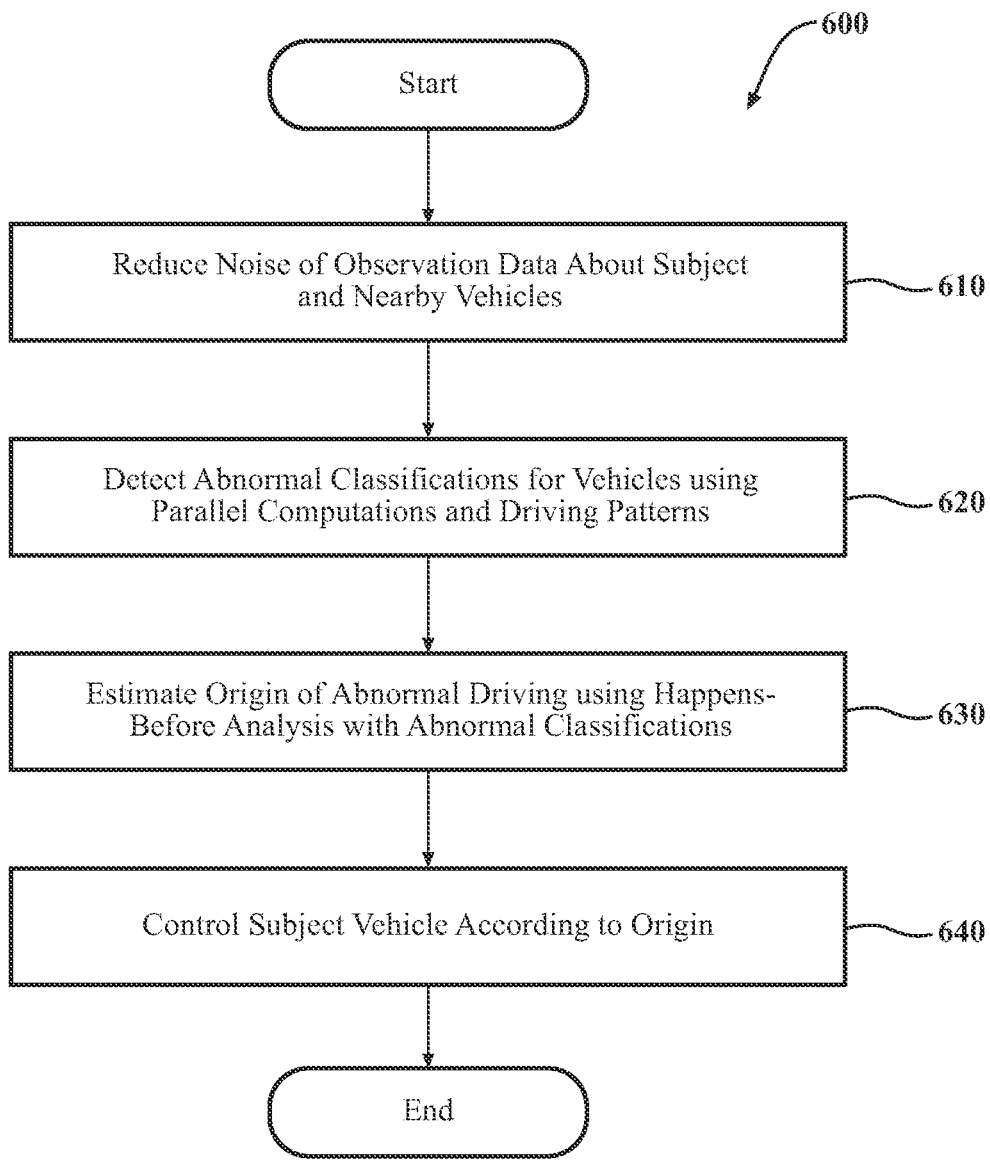
FIG. 6 illustrates one embodiment of a method that is associated with the detection system deriving abnormal classifications for identifying an origin of abnormal driving in a driving scenario.

Regarding FIG. 6, a flowchart of a method 600 that is associated with the detection system 170 deriving abnormal classifications for identifying an origin of abnormal driving in a driving scenario. Method 600 will be discussed from the perspective of the detection system 170 of FIGS. 1 and 2. While method 600 is discussed in combination with the detection system 170, it should be appreciated that the method 600 is not limited to being implemented within the detection system 170 but is instead one example of a system that may implement the method 600.

At 610, the detection system 170 reduces noise of observation data about the subject vehicle (e.g., ego vehicle) and the nearby vehicles. Here, the sensor data 250 may include the observation data. The nearby vehicles include the follower and preceding vehicles. In one approach, the detection system 170 filters the observation data for reducing noise generated due to a faulty sensor. For example, filtering involves discarding a distance or speed value of the ego vehicle $100_1$ above multiple standard deviations from a mean value. Discarding these values prevents perceiving noisy values as sudden movements by vehicles associated with abnormal behavior. In this way, the detection system 170 increases the reliability of computations and estimations for identifying the origin of abnormal driving.

At 620, the detection system 170 detects abnormal classifications for vehicles using parallel computations and observed driving patterns. Here, driving patterns may include driving habits, movement patterns, and so on. As previously explained, the parallel computations add modalities and dimensions that increase classification accuracy. This improves identifying the origin of abnormal driving through distinct and individual behavior observations for the subject vehicle and the nearby vehicles. For example, the detection system 170 determines that a follower vehicle is distracted from spikes and dips in the following distance above a threshold within a time window. This behavior indicates the erratic distance to short movements associated with distracted driving. In another example, parameter fluctuations in the sensor data 250 for one of speed, lane offset, and so on each exceed different thresholds that the detection system 170 measures for abnormalities. Furthermore, in one approach, the computations involve time-series analysis with the observation data for determining patterns having statistical and predictive significance. In this way, the detection system 170 improves the reliability of classification through the time-series analysis by reducing the influence of noise between data samples.

Moreover, the detection system 170 classifies sudden speed changes of the ego vehicle $100_1$ using parallel computations for reducing false positives associated with abnormal driving. In one approach, the detection system 170 identifies the ego vehicle $100_1$ as aggressive if vehicle speeds and acceleration for a driving pattern deviate above a threshold within a time frame (e.g., five seconds). As explained above, false positives are reduced further by the detection system 170 using a ML model that predicts classifications with the time-series of both distance and speed data for a driving scenario. In one approach, the output is a probability of accuracy for the abnormal classification (e.g., aggressive, distracted, etc.). As such, the detection system 170 can improve the reliability of downstream tasks (e.g., notification systems) according to probabilities.

At 630, the estimation module 220 estimates the origin of abnormal driving using happens-before analysis with the abnormal classifications. As previously explained, happens-before analysis derives a stable model of distributed events in time by synchronizing, sorting, and ordering results from the abnormal classifications. Here, the detection system 170 may assess an abnormal event one-by-one and reach a general consensus about causality between discrete points through logical reasoning. For example, unnecessary acceleration within a time frame by the ego vehicle $100_1$ erroneously makes the follower vehicle look erratic when analyzing following distances. In another example, the follower vehicle imitates the driving of the ego vehicle $100_1$ by accelerating and decelerating erratically. This can cause the ego vehicle $100_1$ to label the follower as an aggressive driver. For these driving patterns, the happens-before analysis reliably identifies that the origin of abnormal driving is the ego vehicle $100_1$ rather than the follower vehicle through synchronization and sorting.

Furthermore, the happens-before analysis computes causality by ordering unusual driving patterns classified using the sensor data 250. For example, the ego vehicle $100_1$ initially perceives a follower vehicle as an aggressive driver from detecting an escape maneuver. However, the happens-before analysis determines that the escape maneuver was actually caused by the ego vehicle $100_1$ swerving inside a lane from distracted driving. In this way, the happens-before analysis reduces false positives and improves accuracy about the origin of abnormal driving.

At 640, the detection system 170 receives a driving command to control the vehicle 100 according to the origin. For example, the detection system 170 generates a steering suggestion for lane centering if the ego vehicle $100_1$ is the origin that mitigates collision risk. The steering suggestion reduces swerving and increases regular traffic flow by the following vehicle. In one approach, the detection system 170 suggests a lane change if a preceding vehicle is driving too aggressively. For instance, following distance X varied over 10 m, lateral distance Y over 5 m, and relative velocity exceeded 15 km/h within a 5 s window. Thus, a driving command from the operator is received by the detection system 170 according to a respective suggestion associated with improved reliability about the origin of abnormal driving.

FIG. 1 will now be discussed in full detail as an example environment within which the system and methods disclosed herein may operate. In some instances, the vehicle 100 is configured to switch selectively between different modes of operation/control according to the direction of one or more modules/systems of the vehicle 100. In one approach, the modes include: 0, no automation; 1, driver assistance; 2, partial automation; 3, conditional automation; 4, high automation; and 5, full automation. In one or more arrangements, the vehicle 100 can be configured to operate in a subset of possible modes.

In one or more embodiments, the vehicle 100 is an automated or autonomous vehicle. As used herein, "autonomous vehicle" refers to a vehicle that is capable of operating in an autonomous mode (e.g., category 5, full automation). "Automated mode" or "autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU), an application-specific integrated circuit (ASIC), a microprocessor, etc. The vehicle 100 can include one or more data stores 115 for storing one or more types of data. The data store(s) 115 can include volatile and/or non-volatile memory. Examples of suitable data stores 115 include RAM, flash memory, ROM, Programmable Read-Only Memory (PROM), Erasable Programmable Read-Only Memory (EPROM), Electrically Erasable Programmable Read-Only Memory (EEPROM), registers, magnetic disks, optical disks, and hard drives. The data store(s) 115 can be a component of the processor(s) 110, or the data store(s) 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry.

In one or more arrangements, the map data 116 can include one or more terrain maps 117. The terrain map(s) 117 can include information about the terrain, roads, surfaces, and/or other features of one or more geographic areas. The terrain map(s) 117 can include elevation data in the one or more geographic areas. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles can include trees, buildings, curbs, fences, railings, medians, utility poles, statues, monuments, signs, benches, furniture, mailboxes, large rocks, or hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

One or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information about one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means a device that can detect, and/or sense something. In at least one embodiment, the one or more sensors detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors may function independently or two or more of the sensors may function in combination. The sensor system 120 and/or the one or more sensors can be operatively connected to the processor(s) 110, the data store(s) 115, and/or another element of the vehicle 100. The sensor system 120 can produce observations about a portion of the environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect information about the vehicle 100 itself. In one or more arrangements, the vehicle sensor(s) 121 can be configured to detect position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect one or more characteristics of the vehicle 100 and/or a manner in which the vehicle 100 is operating. In one or more arrangements, the vehicle sensor(s) 121 can include a speedometer to determine a current speed of the vehicle 100.

Alternatively, or in addition, the sensor system 120 can include one or more environment sensors 122 configured to acquire data about an environment surrounding the vehicle 100 in which the vehicle 100 is operating. "Surrounding environment data" includes data about the external environment in which the vehicle is located or one or more portions thereof. For example, the one or more environment sensors 122 can be configured to sense obstacles in at least a portion of the external environment of the vehicle 100 and/or data about such obstacles. Such obstacles may be stationary objects and/or dynamic objects. The one or more environment sensors 122 can be configured to detect other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more of: radar sensors 123, LIDAR sensors 124, sonar sensors 125, weather sensors, haptic sensors, locational sensors, and/or one or more cameras 126. In one or more arrangements, the one or more cameras 126 can be high dynamic range (HDR) cameras, stereo, or infrared (IR) cameras.

The vehicle 100 can include an input system 130. An "input system" includes components or arrangement or groups thereof that enable various entities to enter data into a machine. The input system 130 can receive an input from a vehicle occupant. The vehicle 100 can include an output system 135. An "output system" includes one or more components that facilitate presenting data to a vehicle occupant.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, any of the systems or portions thereof may be otherwise combined or segregated via hardware and/or software within the vehicle 100. The vehicle 100 can include a propulsion system 141, a braking system 142, a steering system 143, a throttle system 144, a transmission system 145, a signaling system 146, and/or a navigation system 147. Any of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the detection system 170, and/or the automated driving module(s) 160 can be operatively connected to communicate with the various vehicle systems 140 and/or individual components thereof. For example, returning to FIG. 1, the processor(s) 110 and/or the automated driving module(s) 160 can be in communication to send and/or receive information from the various vehicle systems 140 to control the movement of the vehicle 100. The processor(s) 110, the detection system 170, and/or the automated driving module(s) 160 may control some or all of the vehicle systems 140 and, thus, may be partially or fully autonomous as defined by the society of automotive engineers (SAE) levels 0 to 5.

The processor(s) 110, the detection system 170, and/or the automated driving module(s) 160 can be operatively connected to communicate with the various vehicle systems 140 and/or individual components thereof. For example, returning to FIG. 1, the processor(s) 110, the detection system 170, and/or the automated driving module(s) 160 can be in communication to send and/or receive information from the various vehicle systems 140 to control the movement of the vehicle 100. The processor(s) 110, the detection system 170, and/or the automated driving module(s) 160 may control some or all of the vehicle systems 140.

The processor(s) 110, the detection system 170, and/or the automated driving module(s) 160 may be operable to control the navigation and maneuvering of the vehicle 100 by controlling one or more of the vehicle systems 140 and/or components thereof. For instance, when operating in an autonomous mode, the processor(s) 110, the detection system 170, and/or the automated driving module(s) 160 can control the direction and/or speed of the vehicle 100. The processor(s) 110, the detection system 170, and/or the automated driving module(s) 160 can cause the vehicle 100 to accelerate, decelerate, and/or change direction. As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be an element or a combination of elements operable to alter one or more of the vehicle systems 140 or components thereof responsive to receiving signals or other inputs from the processor(s) 110 and/or the automated driving module(s) 160. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor(s) 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processors 110. Alternatively, or in addition, one or more data stores 115 may contain such instructions.

In one or more arrangements, one or more of the modules described herein can include artificial intelligence elements, e.g., neural network, fuzzy logic, or other machine learning algorithms. Furthermore, in one or more arrangements, one or more of the modules can be distributed among a plurality of the modules described herein. In one or more arrangements, two or more of the modules described herein can be combined into a single module.

The vehicle 100 can include one or more automated driving modules 160. The automated driving module(s) 160 can be configured to receive data from the sensor system 120 and/or any other type of system capable of capturing information relating to the vehicle 100 and/or the external environment of the vehicle 100. In one or more arrangements, the automated driving module(s) 160 can use such data to generate one or more driving scene models. The automated driving module(s) 160 can determine position and velocity of the vehicle 100. The automated driving module(s) 160 can determine the location of obstacles, obstacles, or other environmental features including traffic signs, trees, shrubs, neighboring vehicles, pedestrians, etc.

The automated driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated driving module(s) 160 either independently or in combination with the detection system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The automated driving module(s) 160 can be configured to implement determined driving maneuvers. The automated driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The automated driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Furthermore, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods, and computer program products according to various embodiments. In this regard, a block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein.

The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a ROM, an EPROM or Flash memory, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the present arrangements may be written in any combination of one or more programming languages, including an object-oriented programming language such as Java™, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all combinations of one or more of the associated listed items. As an example, the phrase "at least one of A, B, and C" includes A, B, C, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A detection system comprising:
a processor; and
a memory storing instructions that, when executed by the processor, cause the processor to:
detect, using parallel computations, abnormal classifications associated with a subject vehicle and nearby vehicles according to driving patterns derived from observation data, the abnormal classifications being associated with exceeding a position range in the observation data;
estimate an origin of abnormal driving with happens-before analysis according to the abnormal classifications, and the abnormal driving is associated with deviations in a traffic flow associated with the subject vehicle and the nearby vehicles, and the happens-before analysis outputs interactions between the subject vehicle and the nearby vehicles by temporal organization of the abnormal classifications; and
control the subject vehicle using a driving command according to the origin.

2. The detection system of claim 1, wherein the instructions to estimate the origin of the abnormal driving further include instructions to:
determine, using the happens-before analysis, that distracted driving by the subject vehicle preceded aggressive driving by the nearby vehicles; and
output according to the happens-before analysis that the subject vehicle is the origin of the abnormal driving.

3. The detection system of claim 2, wherein the instructions to determine that the distracted driving by the subject vehicle preceded the aggressive driving further include instructions to predict that one of the nearby vehicles preceding the subject vehicle is moving in a motion pattern within a driving lane and a separation distance that is constant.

4. The detection system of claim 1, wherein the instructions to detect the abnormal classifications further include instructions to analyze, by the subject vehicle, following distances between the subject vehicle and a follower vehicle and the subject vehicle and a preceding vehicle individually for the parallel computations.

5. The detection system of claim 1, wherein the instructions to detect the abnormal classifications further include instructions to:
compare the driving patterns of the subject vehicle and the nearby vehicles in a time-series using locations derived from the observation data; and
identify abnormal events from abrupt deviations to following distances and speed between the subject vehicle and the nearby vehicles using the driving patterns in the time-series.

6. The detection system of claim 5 further including instructions to:
process the time-series by a machine learning (ML) model; and
output, by the ML model, probabilities of accuracy associated with the abnormal classifications for the subject vehicle and the nearby vehicles.

7. The detection system of claim 1 further including instructions to communicate the origin to a server for reducing collision risk, wherein the server forms a mitigation plan for automated vehicles of the nearby vehicles.

8. The detection system of claim 1 further including instructions to:

reduce noise by filtering the observation data about the subject vehicle and the nearby vehicles in a driving scenario associated with the abnormal classifications; and derive a model of abnormal events in time with the happens-before analysis for synchronization and ordering of the abnormal classifications.

9. The detection system of claim 1, wherein the abnormal classifications include one of aggressive driving, speeding, distracted driving, erratic trajectories, reckless driving, and off-center trajectories.

10. A non-transitory computer-readable medium comprising:

instructions that when executed by a processor cause the processor to:

detect, using parallel computations, abnormal classifications associated with a subject vehicle and nearby vehicles according to driving patterns derived from observation data, the abnormal classifications being associated with exceeding a position range in the observation data;

estimate an origin of abnormal driving with happens-before analysis according to the abnormal classifications, and the abnormal driving is associated with deviations in a traffic flow associated with the subject vehicle and the nearby vehicles, and the happens-before analysis outputs interactions between the subject vehicle and the nearby vehicles by temporal organization of the abnormal classifications; and control the subject vehicle using a driving command according to the origin.

11. A method comprising:

detecting, using parallel computations, abnormal classifications associated with a subject vehicle and nearby vehicles according to driving patterns derived from observation data, the abnormal classifications being associated with exceeding a position range in the observation data;

estimating an origin of abnormal driving with happens-before analysis according to the abnormal classifications, and the abnormal driving is associated with deviations in a traffic flow associated with the subject vehicle and the nearby vehicles, and the happens-before analysis outputs interactions between the subject vehicle and the nearby vehicles by temporal organization of the abnormal classifications; and controlling the subject vehicle using a driving command according to the origin.

12. The method of claim 11, wherein estimating the origin of the abnormal driving further includes:

determining, using the happens-before analysis, that distracted driving by the subject vehicle preceded aggressive driving by the nearby vehicles; and outputting according to the happens-before analysis that the subject vehicle is the origin of the abnormal driving.

13. The method of claim 12, wherein determining that the distracted driving by the subject vehicle preceded the aggressive driving further includes predicting that one of the nearby vehicles preceding the subject vehicle is moving in a motion pattern within a driving lane and a separation distance that is constant.

14. The method of claim 11, wherein detecting the abnormal classifications further includes analyzing, by the subject vehicle, following distances between the subject vehicle and a follower vehicle and the subject vehicle and a preceding vehicle individually for the parallel computations.

15. The method of claim 11, wherein detecting the abnormal classifications further includes:

comparing the driving patterns of the subject vehicle and the nearby vehicles in a time-series using locations derived from the observation data; and identifying abnormal events from abrupt deviations to following distances and speed between the subject vehicle and the nearby vehicles using the driving patterns in the time-series.

16. The method of claim 15 further comprising:

processing the time-series by a machine learning (ML) model; and outputting, by the ML model, probabilities of accuracy associated with the abnormal classifications for the subject vehicle and the nearby vehicles.

17. The method of claim 11 further comprising communicating the origin to a server for reducing collision risk, wherein the server forms a mitigation plan for automated vehicles of the nearby vehicles.

18. The method of claim 11 further comprising:

reducing noise by filtering the observation data about the subject vehicle and the nearby vehicles in a driving scenario associated with the abnormal classifications; and deriving a model of abnormal events in time with the happens-before analysis for synchronization and ordering of the abnormal classifications.

19. The method of claim 11, wherein the nearby vehicles include a follower vehicle and preceding vehicles associated with the subject vehicle and the position range is associated with one of constant acceleration and deceleration for vehicle control.

20. The method of claim 11, wherein the abnormal classifications include one of aggressive driving, speeding, distracted driving, erratic trajectories, reckless driving, and off-center trajectories.

* * * * *